United States Patent [19]

Hsiao

[11] Patent Number: 4,777,978

[45] Date of Patent: Oct. 18, 1988

[54] PRESSURE REGULATOR WITH CAM MECHANISM FOR SPRING TENSION ADJUSTMENT

[76] Inventor: Jin L. Hsiao, No. 55-1, Tuan Chu Lane, Tuan Chu Li Chiayi City, Taiwan

[21] Appl. No.: 114,444

[22] Filed: Oct. 27, 1987

[51] Int. Cl.⁴ .................. F16K 17/06; F16K 15/20; F16K 37/00
[52] U.S. Cl. ................................ 137/524; 137/557; 200/61.2 S; 116/142 FP
[58] Field of Search .............. 137/524, 540, 551, 552, 137/557; 200/61.2 S, 81 R; 116/142 FP

[56] References Cited

U.S. PATENT DOCUMENTS

| | | |
|---|---|---|
| 1,176,703 | 3/1916 | Durham .......................... 137/524 |
| 1,759,796 | 5/1930 | Miles ........................... 137/524 X |
| 1,838,811 | 12/1931 | Doran ........................... 137/524 |
| 2,587,421 | 2/1952 | Willach ......................... 137/524 X |
| 2,853,098 | 9/1958 | Fritzsche ....................... 137/524 X |
| 4,545,405 | 10/1985 | LaBelle ........................ 137/524 |
| 4,708,169 | 11/1987 | Liu ............................ 137/557 |

Primary Examiner—John Rivell
Attorney, Agent, or Firm—Wells, St. John & Roberts

[57] ABSTRACT

A pressure regulator includes a valve urged by a spring and a plunger in connection with the spring to adjust the tension of the spring. The plunger has a transverse pin engaging with a camming face of a sleeve around the plunger. The camming face lies in a plane inclining a radial plane of the plunger and causes the plunger to move axially when the transverse pin moves along the camming face.

4 Claims, 2 Drawing Sheets

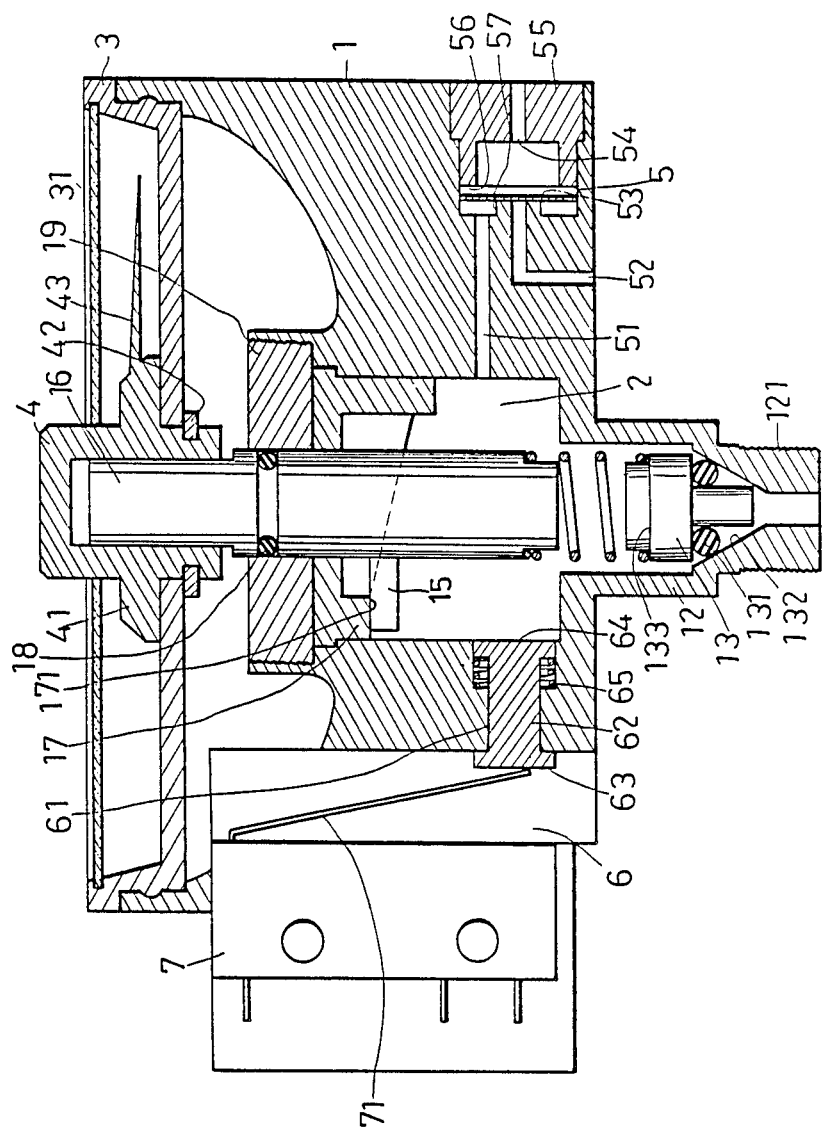

PRESSURE REGULATOR WITH CAM MECHANISM FOR SPRING TENSION ADJUSTMENT

BACKGROUND OF THE INVENTION

This invention relates to a pressure regulator which produces an audio signal when a pressure detected thereby is greater than a predetermined pressure, and particularly to a pressure regulator having a cam mechanism for adjusting the tension of a spring which urges a valve to close a pressure inlet of the pressure regulator.

It is known in the art to provide signalling pressure gauges to produce an audio signal or a light signal when the pressure in a tire exceeds a predetermined pressure. Generally, these signalling devices include a valve urged by a spring associated with a tension adjusting means which includes two threadedly interconnected tubular members, one of the tubular members being graduated. Various types of pressure gauges are suggested heretofore. The examples of the references relating thereto are U.S. Pat. Nos. 1,196,142, 1,482,517 and 2,334,095.

SUMMARY OF THE INVENTION

An object of the invention is to provide a pressure regulator which is simple and novel.

According to one aspect of the present invention, a pressure regulator comprises: a housing having a pressure chamber communicated with a pressure inlet; a graduated disc mounted on one side of the housing opposite to the pressure inlet; a pointer holder associated with the graduated disc; a valve disposed at the pressure inlet; a spring member urging the valve to close the pressure inlet, and having an end in connection with the valve member; means for adjusting the tension of the spring member, having a plunger which has one end in connection with the second end of the spring member and the other end in connection with the pointer holder, the plunger being rotatable together with the pointer holder and axially slideable to increase or decrease the tension of the spring and having a radially extending pin; a stationary sleeve member sleeved around the plunger and having a camming end face substantially lying on an inclined radial plane of the sleeve member, the camming end face engaging with the radial pin and capable of causing the plunger to move axially when the radial pin moves relative to the camming end face; a pressure release passage means in communication with the housing and being opened to atmosphere; and a diaphragm member disposed in the pressure release passage means for producing an audio signal when the pressure in the chamber exceeds a predetermined pressure.

In another aspect of the invention, the pressure regulator includes: a second plunger piece provided in a throughhole extending from the chamber, the second plunger piece being capable of extending outward from the throughhole in response to the pressure in the chamber; a switch member; and a resilient means to operate the switch member, the resilient means being in contact with the second plunger to be actuated by the second plunger piece to control the switch member when the pressure in the chamber exceeds a predetermined pressure.

The present exemplary preferred embodiment will be described in detail with reference to the accompanying drawings, in which:

BRIEF DESCRIPTION OF THE DRAWINGS

FIG. 2 is a sectional view thereof.

DETAILED DESCRIPTION OF THE PREFERRED EMBODIMENT

Figure 1:
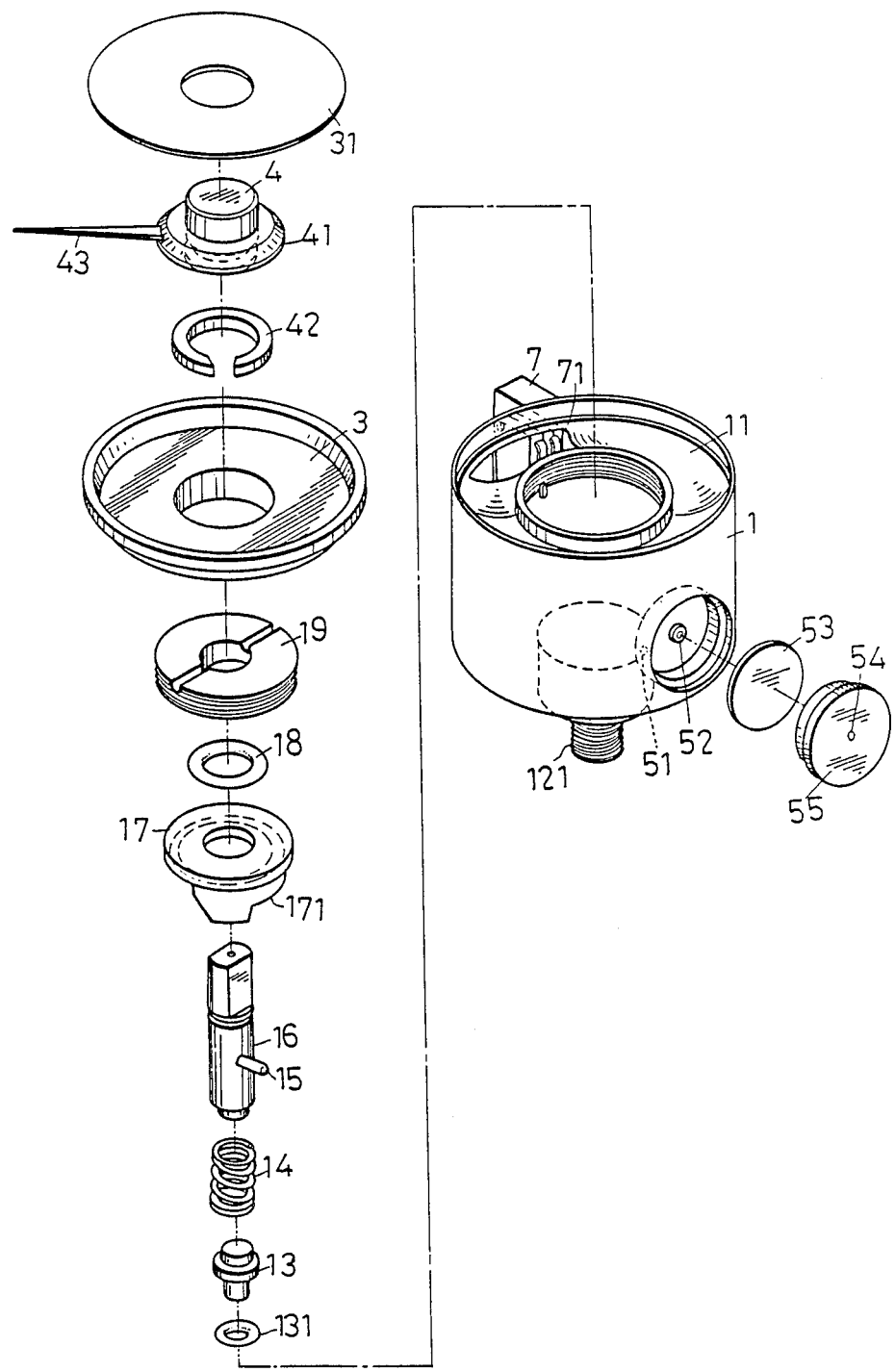
FIG. 1 is an exploded view of a pressure regulator exemplifying the present invention.

Referring to FIGS. 1 and 2, an embodiment of the pressure regulator is shown, including a substantially cylindrical housing 1 which has at one end a substantially annular recess 11 and at the other end a pressure inlet 12 having a threaded tubular adaptor 121. A pressure chamber 2 is provided in the housing 1 and communicated with the pressure inlet 12. A valve 13 is provided in the pressure inlet 12 and urged by a compression spring 14 to normally close the inlet 12. The valve 13 is a substantially cylindrical member having a sealing ring 131 to contact against a valve seat 132 and a shoulder formation 133 at an end opposite to the sealing ring 131. Threadedly fitted in the recess 11 of the housing 1 is a graduated disc 3. On the graduated disc 3 is mounted rotatably a pointer holding sleeve 4. The pointer holding sleeve 4 has an annular flange 41 with a radially extending pointer 43. A C-shaped ring 42 is used to engage with the pointer holding sleeve 4. Above the graduated disc 3 is provided a transparent cover 31. A cover member 19 is coupled threadedly to the wall of the housing 1 to cover the chamber 2. A plunger 16 is made to pass through the cover member 19 and one end of the plunger 16 is inserted into the sleeve 4. The plunger 16 is slideable axially in the sleeve 4 and is in a slideable and sealing relationship with the cover member 19. The end of the plunger 16 is engaged with the spring 14. A cam sleeve 17 is sleeved around the plunger 16 and is fixed to the wall of the housing 1 and in abutment with the cover member 19. The cam sleeve 17 has an end camming face 171 which lies in a plane inclined with respect to plane perpendicular to a longitudinal axis of the cam sleeve 17.

In the wall of the housing 1 at one side of the chamber 2 are provided a recess 5 receiving a plug 55 and a protrusion 57 extending into the recess 5. The plug 55 has a pressure release passage 54 and an annular end 56. A passage 51 extends from the chamber 2 to the recess 5 and a passage 52 extends from the recess 5 to the outside of the housing 1. A resilient diaphragm member 53 is held in the recess 5 between the plug 55 and the protrusion 57. The protrusion 57 is in abutment with the diaphragm member 53.

On the other side of the wall of the housing is provided a cavity 6 and a throughhole 61 extends from the chamber 2 to the cavity 6. The throughhole receives a spring-loaded plunger piece 62 which has an end piece 64 in a slideable and sealing relationship with the wall of the housing. An end 63 of the plunger piece 62 extends out of the throughhole 61 and is in contact with a resilient member 71 of a switch 7 which is used to control an apparatus which supplies compressed air to the device in connection with the pressure regulator. By means of the switch 7, the supply of the pressure to the device can be stopped.

In operation, the adaptor 121 of the device of the invention is connected to a pneumatic tire and the pointer 43 is set at a predetermined pressure by turning the outwardly projecting portion of the pointer holding sleeve 4. When the sleeve 4 is turned, the plunger 16 will rotate as well as move axially within a limited distance due to the movement of the radial pin relative to the cam face of the cam sleeve 17 and is then kept at a certain position, thereby adjusting the tension of the spring 14. When the pressure detected is greater than the predetermined value, the compressed air pushes the spring 14, enters into the chamber 2 through the valve 13, and is then released to atmosphere through the passages 51 and 52 and the passage 54. Due to the presence of the diaphragm 53, the regulator whistles when the excess compressed air is released through the passages 51, 52 and 54. On the other hand, the plunger piece 62 is also pushed outward by the entering compressed air, thereby actuating the spring 71 of the switch 7 which will thereby stop the supply of compressed air to the tire.

With the invention thus explained, it is apparent that various modifications and variations can be made without departing from the scope of the invention. It is therefore intended that the invention be limited as indicated in the appended claims.

What I claim is:

1. A pressure regulator comprising:
   a housing having a first side, a second side opposite to said first side, a pressure inlet at said first side, and a pressure chamber communicated with said first pressure inlet;
   a graduated disc mounted on said second side;
   a pointer holder associated with said graduated disc and having a pointer extending therefrom;
   a valve disposed at said pressure inlet;
   a spring member urging said valve to close said pressure inlet, and having a first end in connection with said valve member and a second end opposite to said first end;
   means for adjusting the tension of said spring member, said means having a plunger which has one end in connection with said second end of said spring member and another end in connection with said pointer holder, said plunger being rotatable together with said pointer holder and axially slideable to increase or decrease the tension of said spring and having a radially extending pin;
   a stationary sleeve member sleeved around said rod and having a camming end face inclined in relation to a plane perpendicular to the axis of said sleeve member, said camming end face being engaged with said radial pin and capable of causing said plunger to move axially when said radial pin moves relative to said camming end face;
   pressure release passage means in communication with said housing and being opened to atmosphere, and release passage means for producing an audio signal when the pressure in said chamber exceeds a predetermined pressure; and
   a diaphragm member disposed adjacent said pressure release passage means for producing an audio signal when the pressure in said chamber exceeds a predetermined pressure; and
   wherein said pointer holder includes a sleeve member which has a bore receiving said other end of said plunger in such a manner that said other end is slideable but not rotatable relative to said sleeve member.

2. A pressure regulator comprising:
   a housing having a first side, a second side opposite to said first side, a pressure inlet at said first side, and a pressure chamber communicated with said first pressure inlet;
   a graduated disc mounted on said second side;
   a pointer holder associated with said graduated disc and having a pointer extending therefrom;
   a valve disposed at said pressure inlet;
   a spring member urging said valve to close said pressure inlet, and having a first end in connection with said valve member and a second end opposite to said first end;
   means for adjusting the tension of said spring member, said means having a plunger which has one end in connection with said second end of said spring member and another end in connection with said pointer holder, said plunger being rotatable together with said pointer holder and axially slideable to increase or decrease the tension of said spring and having a radially extending pin;
   a stationary sleeve member sleeved around said rod and having a camming end face inclined in relation to a plane perpendicular to the axis of said sleeve member, said camming end face being engaged with said radial pin and capable of causing said plunger to move axially when said radial pin moves relative to said camming end face;
   pressure release passage means in communication with said housing and being opened to atmosphere, and release passage means for producing an audio signal when the pressure in said chamber exceeds a predetermined pressure;
   a diaphragm member disposed adjacent said pressure release passage means for producing an audio signal when the pressure in said chamber exceeds a predetermined pressure; and
   wherein said housing includes a wall surrounding said chamber and having a periphery, a recess in said wall opening at said periphery, and a plug member inserted in said recess, said pressure release passage means including a first passage extending from said chamber to said recess, a second passage extending from said recess to said first side of said housing, and a third passage extending in said plug member and opening to atmosphere, said diaphragm member being disposed in said recess.

3. A pressure regulator comprising:
   a housing having a first side, a second side opposite to said first side, a pressure inlet at said first side, and a pressure chamber communicated with said first pressure inlet;
   a graduated disc mounted on said second side;
   a pointer holder associated with said graduated disc and having a pointer extending therefrom;
   a valve disposed at said pressure inlet;
   a spring member urging said valve to close said pressure inlet, and having a first end in connection with said valve member and a second end opposite to said first end;
   means for adjusting the tension of said spring member, said means having a plunger which has one end in connection with said second end of said spring member and another end in connection with said pointer holder, said plunger being rotatable together with said pointer holder and axially slideable to increase or decrease the tension of said spring and having a radially extending pin;

a stationary sleeve member sleeved around said rod and having a camming end face inclined in relation to a plane perpendicular to the axis of said sleeve member, said camming end face being engaged with said radial pin and capable of causing said plunger to move axially when said radial pin moves relative to said camming end face;

pressure release passage means in communication with said housing and being opened to atmosphere, and release passage means for producing an audio signal when the pressure in said chamber exceeds a predetermined pressure;

a diaphragm member disposed adjacent said pressure release passage means for producing an audio signal when the pressure in said chamber exceeds a predetermined pressure;

wherein said housing includes a wall surrounding said chamber and having a periphery, a recess in said wall opening at said periphery, and a plug member inserted in said recess, said pressure release passage means including a first passage extending from said chamber to said recess, a second passage extending from said recess to said first side of said housing, and a third passage extending in said plug member and opening to atmosphere, said diaphragm member being disposed in said recess;

wherein said wall further includes a throughhole extending from said chamber;and a second plunger piece movably inserted in said throughhole and capable of extending outward from said throughhole in response to pressure in said chamber.

4. A pressure regulator comprising:

a housing having a first side, a second side opposite to said first side, a pressure inlet at said first side, and a pressure chamber communicated with said first pressure inlet;

a graduated disc mounted on said second side;

a pointer holder associated with said graduated disc and having a pointer extending therefrom;

a valve disposed at said pressure inlet;

a spring member urging said valve to close said pressure inlet, and having a first end in connection with said valve member and a second end opposite to said first end;

means for adjusting the tension of said spring member, said means having a plunger which has one end in connection with said second end of said spring member and another end in connection with said pointer holder, said plunger being rotatable together with said pointer holder and axially slideable to increase or decrease the tension of said spring and having a radially extending pin;

a stationary sleeve member sleeved around said rod and having a camming end face inclined with respect to a plane perpendicular to the axis of said sleeve member, said camming end face being engaged with said radial pin and capable of causing said plunger to move axially when said radial pin moves relative to said camming end face;

pressure release passage means in communication with said housing and being opened to atmosphere, and release passage means for producing an audio signal when the pressure in said chamber exceeds a predetermined pressure;

a diaphragm member disposed adjacent said pressure release passage means for producing an audio signal when the pressure in said chamber exceeds a predetermined pressure;

wherein said housing includes a wall surrounding said chamber and having a periphery, a recess in said wall opening at said periphery, and a plug member inserted in said recess, said pressure release passage means including a first passage extending from said chamber to said recess, a second passage extending from said recess to said first side of said housing, and a third passage extending in said plug member and opening to atmosphere, said diaphragm member being disposed in said recess;

wherein said wall further includes a throughhole extending from said chamber;

a second plunger piece movably inserted in said throughhole and capable of extending outward from said throughhole in response to pressure in said chamber; and a switch member having a resilient means to operate said switch member, said resilient means being in contact with said second plunger piece.

* * * * *